United States Patent
Aseff (10) Patent No.: US 8,100,285 B2
(45) Date of Patent: Jan. 24, 2012

(54) FOOD COOKING, SERVING AND STORAGE DEVICE

(76) Inventor: Danielle Aseff, Atlanta, GA (US)

( * ) Notice: Subject to any disclaimer, the term of this patent is extended or adjusted under 35 U.S.C. 154(b) by 992 days.

(21) Appl. No.: 12/075,029

(22) Filed: Mar. 7, 2008

(65) Prior Publication Data

US 2009/0057318 A1 Mar. 5, 2009

Related U.S. Application Data

(60) Provisional application No. 60/894,156, filed on Mar. 9, 2007, provisional application No. 61/000,813, filed on Oct. 29, 2007.

(51) Int. Cl.
*A47J 27/00* (2006.01)
*B65D 1/42* (2006.01)
*B65D 6/34* (2006.01)

(52) U.S. Cl. .................. 220/573.1; 220/644; 220/645

(58) Field of Classification Search ............... 220/573.1, 220/644, 645; 219/730, 732; 99/428, 429; 424/423, 426

See application file for complete search history.

(56) References Cited

U.S. PATENT DOCUMENTS

| | | |
|---|---|---|
| 2,462,242 A | 2/1949 | Webb et al. |
| 2,470,593 A | 5/1949 | Webb et al. |
| 2,752,970 A | 7/1956 | Tupper |
| 3,078,006 A | 2/1963 | Price et al. |
| 3,165,227 A | 1/1965 | Muoio |
| 3,447,714 A | 6/1969 | Elliot |
| 3,452,896 A | 7/1969 | Elliot |
| 3,545,604 A | 12/1970 | Gunther |
| 3,788,513 A | 1/1974 | Racz |
| 3,799,914 A | 3/1974 | Cushman et al. |
| 4,293,080 A | 10/1981 | Letica |
| 4,477,517 A | 10/1984 | Rummel |
| 4,576,842 A | 3/1986 | Hartsing et al. |
| 4,684,577 A | 8/1987 | Coq |
| 4,737,389 A | 4/1988 | Hartsing et al. |
| 4,772,653 A | 9/1988 | McKenna |
| 4,922,811 A | 5/1990 | Stumpf |
| 5,010,627 A | 4/1991 | Herrington et al. |
| 5,012,928 A | 5/1991 | Proffitt |
| 5,029,725 A | 7/1991 | Roth |
| 5,377,860 A | 1/1995 | Littlejohn et al. |
| 5,423,453 A | 6/1995 | Fritz |
| 5,443,853 A | 8/1995 | Hayes |
| 5,492,946 A | 2/1996 | Huspeni et al. |
| 5,573,130 A | 11/1996 | Chanal et al. |
| 5,682,730 A | 11/1997 | Dobreski |
| 5,713,669 A | 2/1998 | Thomas et al. |
| 5,928,798 A | 7/1999 | Buongiorno et al. |
| 5,941,642 A | 8/1999 | Darmstadter |
| 5,950,848 A | 9/1999 | Baudin |
| 5,992,679 A | 11/1999 | Porchia et al. |
| 6,032,827 A | 3/2000 | Zettle et al. |
| 6,147,337 A * | 11/2000 | Besser ............... 219/730 |
| 6,168,044 B1 | 1/2001 | Zettle et al. |

(Continued)

FOREIGN PATENT DOCUMENTS

EP 1563988 8/2005

(Continued)

*Primary Examiner* — Bryon Gehman
*Assistant Examiner* — Shawn Braden
(74) *Attorney, Agent, or Firm* — Withers & Keys, LLC (57) ABSTRACT

Containers suitable for use in food cooking, food serving and food storing are disclosed.

20 Claims, 8 Drawing Sheets

U.S. PATENT DOCUMENTS

| | | |
|---|---|---|
| 6,170,696 B1 | 1/2001 | Tucker et al. |
| 6,197,359 B1 | 3/2001 | Llorente |
| 6,202,877 B1 | 3/2001 | La Torre |
| 6,257,431 B1 | 7/2001 | Baudin |
| 6,306,071 B1 | 10/2001 | Tomic |
| 6,332,712 B1 | 12/2001 | Headley |
| 6,385,818 B1 | 5/2002 | Savicki |
| 6,460,716 B1 | 10/2002 | Wong |
| 6,467,647 B1 | 10/2002 | Tucker et al. |
| 6,485,177 B2 | 11/2002 | Bell |
| 6,487,758 B2 | 12/2002 | Shaffer |
| D470,755 S | 2/2003 | Espinel et al. |
| D470,756 S | 2/2003 | Espinel et al. |
| D470,757 S | 2/2003 | Espinel et al. |
| 6,513,659 B1 | 2/2003 | Ogura et al. |
| 6,629,624 B2 | 10/2003 | Stillinger et al. |
| 6,631,823 B2 | 10/2003 | Stillinger et al. |
| 6,649,891 B1 | 11/2003 | Kitko et al. |
| 6,685,046 B2 | 2/2004 | Ogino |
| 6,698,336 B1 | 3/2004 | Siegel et al. |
| 6,713,152 B2 | 3/2004 | Chen et al. |
| 6,797,223 B2 | 9/2004 | Beale et al. |
| 6,868,980 B2 | 3/2005 | Schultz et al. |
| 6,893,724 B2 | 5/2005 | Lin et al. |
| 6,910,599 B2 | 6/2005 | Tucker et al. |
| 7,017,775 B2 | 3/2006 | Zettle et al. |
| 7,032,773 B2 | 4/2006 | Dees et al. |
| 7,105,193 B2 | 9/2006 | Yeung |
| 7,114,632 B2 | 10/2006 | Kraus |
| 7,129,309 B2 | 10/2006 | Fehn |
| 7,158,376 B2 | 1/2007 | Richardson et al. |
| 7,165,672 B2 | 1/2007 | Fago et al. |
| 7,216,769 B2 | 5/2007 | Palder |
| 7,357,270 B2 | 4/2008 | Mayrose |
| 2001/0011620 A1 | 8/2001 | Tiramani et al. |
| 2001/0013452 A1 | 8/2001 | Tiramani et al. |
| 2001/0043977 A1 | 11/2001 | Llorente |
| 2002/0126921 A1 | 9/2002 | Bell |
| 2002/0182352 A1 | 12/2002 | Mitten et al. |
| 2003/0155365 A1 | 8/2003 | Llorente |
| 2003/0157343 A1 | 8/2003 | Yeung |
| 2003/0203140 A1 | 10/2003 | Sapatova et al. |
| 2003/0230588 A1 | 12/2003 | Zepter |
| 2004/0031798 A1 | 2/2004 | Fox et al. |
| 2004/0099147 A1 | 5/2004 | Hubert et al. |
| 2004/0180221 A1 | 9/2004 | Lin et al. |
| 2004/0191369 A1 | 9/2004 | Veillon |
| 2004/0231527 A1 | 11/2004 | Brasset |
| 2004/0249059 A1 | 12/2004 | Akbar et al. |
| 2005/0000960 A1* | 1/2005 | Bergeret .................. 219/732 |
| 2005/0029494 A1 | 2/2005 | Kirchner et al. |
| 2005/0053739 A1 | 3/2005 | Lee et al. |
| 2005/0123218 A1 | 6/2005 | Pokusa |
| 2005/0205577 A1 | 9/2005 | Park |
| 2005/0211101 A1 | 9/2005 | Finnie |
| 2005/0230384 A1 | 10/2005 | Robison et al. |
| 2005/0247212 A1* | 11/2005 | Meeks et al. .................. 99/426 |
| 2005/0263013 A1 | 12/2005 | Siegel et al. |
| 2006/0014876 A1 | 1/2006 | Bushelman et al. |
| 2006/0029301 A1 | 2/2006 | Schreiter |
| 2006/0045949 A1 | 3/2006 | McLaughlin |
| 2006/0073294 A1 | 4/2006 | Hutchinson et al. |
| 2006/0079620 A1 | 4/2006 | Greene |
| 2006/0102584 A1 | 5/2006 | Wellman |
| 2006/0110075 A1 | 5/2006 | Plourde et al. |
| 2006/0112834 A1 | 6/2006 | Imura |
| 2006/0133700 A1 | 6/2006 | Cappel |
| 2006/0151511 A1 | 7/2006 | Kaposi |
| 2006/0177155 A1 | 8/2006 | Owen |
| 2006/0179620 A1 | 8/2006 | MacHacek |
| 2006/0182369 A1 | 8/2006 | Schneider et al. |
| 2006/0186014 A1 | 8/2006 | Ramanujam et al. |
| 2006/0188177 A1 | 8/2006 | Dyer et al. |
| 2006/0210203 A1 | 9/2006 | Gzybowski |
| 2006/0210746 A1 | 9/2006 | Shi et al. |
| 2006/0219713 A1 | 10/2006 | Samuels et al. |
| 2006/0228054 A1 | 10/2006 | Anzini et al. |
| 2006/0230947 A1 | 10/2006 | Poppe |
| 2006/0237451 A1* | 10/2006 | Sameuls et al. .................. 219/730 |
| 2006/0254948 A1 | 11/2006 | Herbert et al. |
| 2006/0266757 A1 | 11/2006 | Camacho et al. |
| 2007/0017066 A1 | 1/2007 | Chen et al. |
| 2007/0026111 A1 | 2/2007 | Cook |
| 2007/0034537 A1 | 2/2007 | Fago et al. |
| 2007/0051727 A1 | 3/2007 | Holley |
| 2007/0062964 A1 | 3/2007 | Kampf et al. |
| 2007/0071852 A1 | 3/2007 | Krueger et al. |
| 2007/0092167 A1 | 4/2007 | Tilman et al. |
| 2007/0092609 A1 | 4/2007 | Jackson et al. |
| 2007/0119743 A1 | 5/2007 | Tucker |
| 2007/0131701 A1 | 6/2007 | Herbert et al. |
| 2007/0138121 A1 | 6/2007 | Stribling et al. |
| 2007/0142569 A1 | 6/2007 | Donovan et al. |

FOREIGN PATENT DOCUMENTS

| | | |
|---|---|---|
| GB | 2154860 | 9/1985 |
| JP | 2004083094 | 3/2004 |
| JP | 2004106878 | 4/2004 |
| WO | WO 0134702 | 5/2001 |
| WO | WO2005003221 | 1/2005 |
| WO | WO 2005073335 | 8/2005 |

* cited by examiner

FIG. 6

FOOD COOKING, SERVING AND STORAGE DEVICE

CROSS-REFERENCE TO RELATED APPLICATIONS

This patent application claims the benefit of priority to U.S. provisional patent application Ser. No. 60/894,156 entitled "FOOD COOKING, SERVING AND STORAGE DEVICE", filed on Mar. 9, 2007, and U.S. provisional patent application Ser. No. 61/000,813 entitled "FOOD COOKING, SERVING AND STORAGE DEVICE", filed on Oct. 29, 2007, the subject matter of each of which is hereby incorporated by reference in its entirety.

TECHNICAL FIELD

The present invention relates to a food cooking, serving and storage device.

BACKGROUND OF THE INVENTION

There is a need in the art for containers that are suitable for use as a food cooking container, a food serving container, a food storage device, or any combination thereof.

SUMMARY OF THE INVENTION

The present invention is directed to containers suitable for use as a food cooking container, a food serving container, a food storage device, or any combination thereof.

The disclosed product makes cooking food quicker, easier and more convenient. It also has potential health benefits and eco-friendly features. It enables the user to go seamlessly from one cooking method to another without worrying that they are using the incorrect receptacle or cover. This seamless method of cooking, reheating, serving and storing food is enabled by the device because of the device material, which is comprised of FDA and/or food grade silicone and these user benefits are also achieved by the general shape of the device, that is, having a lid that closes, snaps or locks onto the bottom bowl-shaped piece.

In one exemplary embodiment, the container comprises a food storage component comprising at least one side wall, a side wall outer surface, a side wall inner surface, and a rim extending along an edge of the at least one side wall; and a lid component that is releasably attachable to the food storage component along the rim, wherein the food storage component and the lid provide a sealed volume operatively adapted for food storage that is bound by (i) the inner surface of the at least one side wall and (ii) an outer surface of the lid when the lid is releasably attached to the food storage component; wherein at least a portion of a cross-section of the at least one side wall extending from the side wall inner surface to the side wall outer surface comprises a multi-layered structure comprising an inner layer of food grade silicone material, an outer layer of food grade silicone material, and an intermediate layer of a high temperature polymer encapsulated by the inner and outer layers, the high temperature polymer being selected from the group consisting of a polyphthalamide, a polysulfone, a polyethersulfone a polyphenylsulfone, a polyamideimide, a liquid crystal polymer, and any combination thereof. In one desired embodiment, the high temperature polymer comprises a liquid crystal polymer.

In another exemplary embodiment, the container comprises a food storage component comprising at least one side wall, a side wall outer surface, a side wall inner surface, and a rim extending along an edge of the at least one side wall; wherein the food storage component provides a volume operatively adapted for food storage that is bound by the inner surface of the at least one side wall; and wherein at least a portion of a cross-section of the at least one side wall extending from the side wall inner surface to the side wall outer surface comprises a multi-layered structure comprising an inner layer of food grade silicone material, an outer layer of food grade silicone material, and an intermediate layer of a high temperature polymer encapsulated by said inner and outer layers, the high temperature polymer being selected from the group consisting of a polyphthalamide, a polysulfone, a polyethersulfone a polyphenylsulfone, a polyamideimide, a liquid crystal polymer, and any combination thereof; the intermediate layer comprising a ribbon structure in the form of a single continuous loop, at least a portion of which extends along a height direction from a lower portion of the food storage component to an upper portion of the food storage component.

In yet another exemplary embodiment, the container comprises a food storage component comprising at least one side wall, a side wall outer surface, a side wall inner surface, and a rim extending along an edge of the at least one side wall; wherein the food storage component provides a volume operatively adapted for food storage that is bound by the inner surface of the at least one side wall; and wherein at least a portion of a cross-section of the at least one side wall extending from the side wall inner surface to the side wall outer surface comprises a multi-layered structure comprising an inner layer of food grade silicone material, an outer layer of food grade silicone material, and an intermediate layer of a high temperature polymer encapsulated by said inner and outer layers, the high temperature polymer comprising a liquid crystal polymer; the intermediate layer comprising a ribbon structure in the form of a single continuous star-like structure having a central ribbon portion and multiple appendages extending from the central ribbon portion, the multiple appendages extending along a height direction from a lower portion of the food storage component to an upper portion of the food storage component.

The present invention is further directed to methods of making and using the disclosed containers. In one exemplary method, the method of making a container comprises forming an intermediate layer via a first thermoforming step, the intermediate layer comprising a high temperature polymer, the high temperature polymer being selected from the group consisting of a polyphthalamide, a polysulfone, a polyethersulfone a polyphenylsulfone, a polyamideimide, a liquid crystal polymer, and any combination thereof; encapsulating the intermediate layer with inner and outer layers to form a multi-layered structure, the inner and outer layers comprising a food grade silicone material; forming the multi-layered structure into a food storage component via a second thermoforming step, the food storage component comprising at least one side wall, a side wall outer surface, a side wall inner surface, and a rim extending along an edge of the at least one side wall, wherein the food storage component provides a volume operatively adapted for food storage that is bound by the inner surface of the at least one side wall; and optionally, forming a lid component via a third thermoforming step, the lid component being releasably attachable to the food storage component along the rim. In one desired embodiment, each of the thermoforming steps comprises a molding (e.g., an injection molding) step.

These and other features and advantages of the present invention will become apparent after a review of the following detailed description of the disclosed embodiments and the appended claims.

BRIEF DESCRIPTION OF THE DRAWINGS

The present invention is further described with reference to the appended figures, wherein.

DETAILED DESCRIPTION OF PREFERRED EMBODIMENTS

Although the present invention is herein described in terms of specific embodiments, it will be readily apparent to those skilled in this art that various modifications, rearrangements, and substitutions can be made without departing from the spirit of the invention. The scope of the present invention is thus only limited by the claims appended hereto.

The main components of this product are a top lid and a bottom piece that fit together to form an air and water tight seal. This product will store and also cook food. The main materials used in this product are silicone and a reinforcing high temperature polymer (e.g., a liquid crystal polymer). The top component (e.g., lid component) is meant to cover and protect food while stored and also to allow different cooking methods, such as boiling in water, microwaving, baking and freezing. The bottom component will be the deep and rounded area that holds the food, similar in shape to a bowl with a flat bottom so it can sit on a flat surface without moving. The top lid component is desirably slightly rounded and fits snugly onto the bottom piece. The top piece could also be relatively flat in shape and the bottom piece could be deep and rounded like a bowl. The top piece could have a handle, edge or notch that would facilitate the user to more easily open and close the top piece.

The top lid and the bottom piece fit together to hold the food during storage and cooking applications. The top can also be set on top instead of locked into the bottom piece to just cover the food while allowing it to ventilate during cooking methods of baking or microwaving. The bottom piece desirably has a flat area so it can sit on a surface evenly. There are several different types of construction for this product that would achieve the same end goal of cooking and storing food. There is a top lid and a bottom piece that fit together. The construction of the components could be fitted together by notches and/or recessed tracks that slide to close, a snap-on lid to bottom feature, or another incarnation of design that best facilitates the cooking and storage of food combined with the particular material used in the most effective way. In other words, the way the final design and incarnation of this product looks will achieve the same goal of cooking and storing food efficiently. This product is designed to be a receptacle for food that can be closed, opened and resealed over and over. The design of this product will be two pieces where the top and bottom piece fit together tightly.

The product of the present invention can be used to store food in the refrigerator and freezer. The product of the present invention can also be used to cook food in the oven. The product of the present invention can also be used to eat out of like a bowl, plate or serving dish. The product of the present invention could also be used to store food such as pet food or dry ingredients in a non-refrigerated environment.

The product of the present invention is comprised, at least partially, of food or medical grade silicone. Desirably, the product comprises a food grade silicone on the entire exterior portions of the product. If there is a reinforcing material used other than silicone, the reinforced material is dipped, sprayed, coated or injection overmolded with silicone to allow cooking and storage of food with the properties of silicone.

The product of the present invention can be reinforced with an inner core of fiberglass, glass or other suitable material to give it extra rigidity. This inner core could be just in the base area, just on the sides, non-continuous or continuous area(s) internally. It could also be reinforced externally with a rigid material like fiberglass, but still be primarily composed of food grade silicone. It can also be made by combining or otherwise integrating strands of fiberglass into the silicone for a homogenous reinforced material. The lid and bowl will retain some flexibility, but generally be reinforced enough for the product to be held and picked up without it flopping over, and placed in and out of cooking appliances without needing an additional piece of cookware or utensil to help facilitate the moving of the product through the various cooking methods or spilling out contents.

The material choice and design of the product of the present invention enable a user to (1) utilize the product to cook food in the microwave or convection oven; (2) utilize the product to store food in the freezer; (3) clean the product in a dishwasher; and (4) utilize the product to store and eat out of without potential troubles associated with different cookware, such as plasticizers releasing vapors into the food, metal cookware catching on fire in the microwave, and glass containers breaking especially when hot from the oven. The product also has a nice design and aesthetic quality, making it an attractive and useful product. The product may be created in different colors, shapes and variations such as with handles, lids, and different sizes.

The product of the present invention takes the place of many different kitchen cookware and utensils, making cooking quicker, easier, more convenient and healthier than other existing products. The product of the present invention takes the guesswork out of deciding which containers are suitable for which cooking application. It also is healthier than cooking in plastic containers since many products such as plastic bowls and bags release harmful plasticizers into the food when used, for example, in the microwave.

The product of the present invention will also have the feature of being able to close and open repeatedly. It will be able to seal and reseal by different methods. One method of such closure could be a base bowl with a lid that snaps on for an air and water tight seal. The top component (e.g., lid) would snap onto the base piece (e.g., base bowl) forming a tight seal to protect food from the elements, allow it to be stored and cooked in without spilling the contents.

The product of the present invention can also store non-perishable foods in non-refrigerated areas such as the pantry or closet. The product of the present invention is multi-functional, as it can also be used by campers and hikers to easily and lightly store food items and then be used to also cook in.

One main advantage of the present invention is to have one single product that can be used for storage, cooking and serving of food. It is meant to take the guesswork out of which containers are compatible with which types of cooking methods (e.g., microwave, oven, freezer, boiling water, and dishwasher) and which lids are appropriate for use with which kitchen applications. The finished product could also be used for applications other than cooking and food service. For example, the design and material combinations lends itself to other applications (e.g., storage of materials other than food) where the properties of silicone are desired, but the strength, rigidity and reinforcement are needed from a second high temperature material like a liquid crystal polymer.

Figure 1:
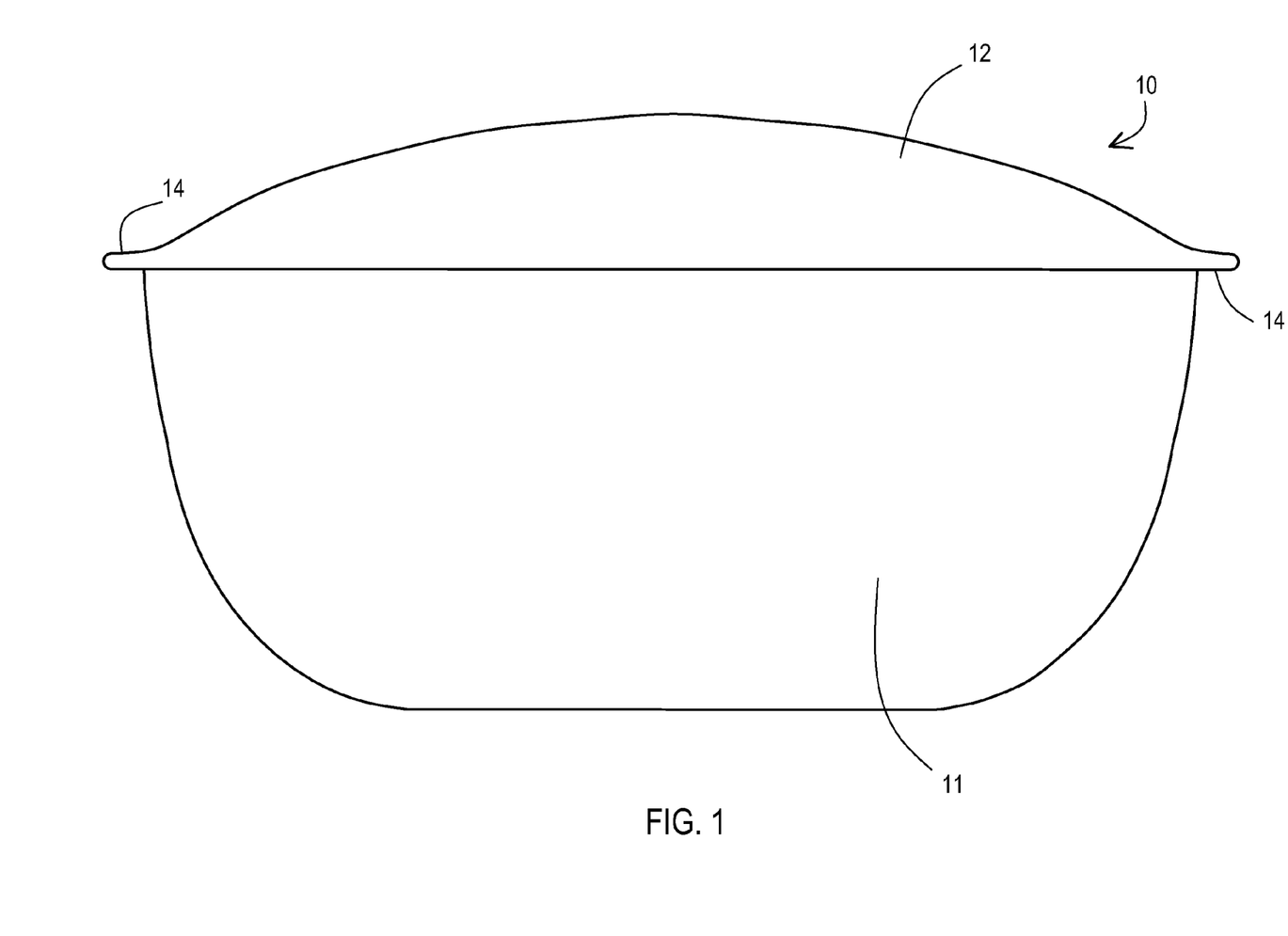
FIG. 1 depicts a schematic view of an exemplary container of the present invention.

FIG. 1 depicts a schematic view of an exemplary container of the present invention. As shown in FIG. 1, exemplary container 10 comprises a main body component 11 and a lid component 12. Lid 12 comprises an overhanging lip 14 to enable easy removal of lid component 12 from main body component 11.

Figure 2:
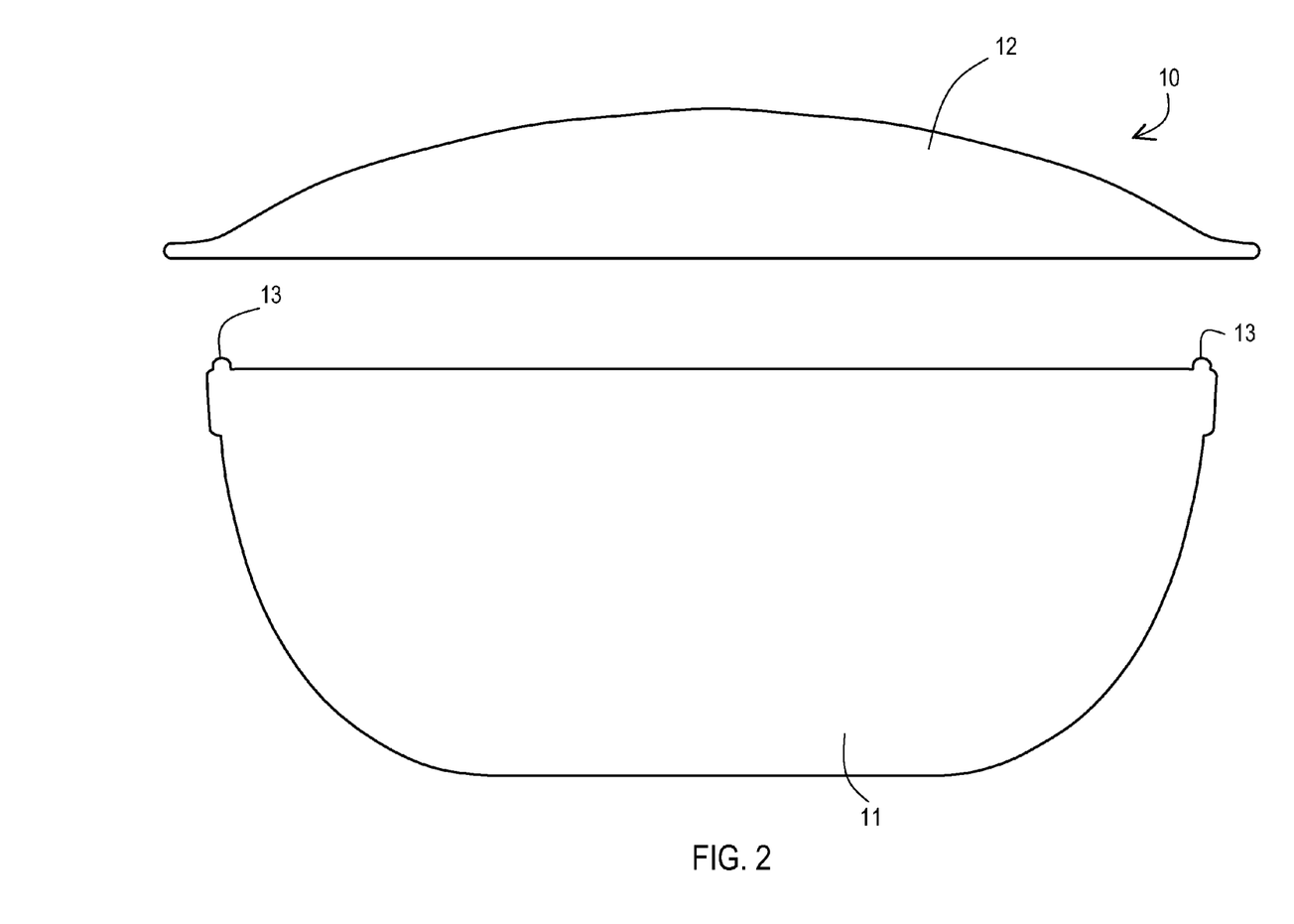
FIG. 2 depicts a schematic view of the exemplary container of FIG. 1 with the lid component separated from the base component.

FIG. 2 depicts a schematic view of exemplary container 10 of FIG. 1 with lid component 12 separated from main body component 11. As shown in FIG. 2, main body component 11 of exemplary container 10 further comprises a raised edge 13, which releasably engages with a corresponding channel or recessed groove (not shown) along a lower surface of an outer periphery of lid component 12.

Figure 3:
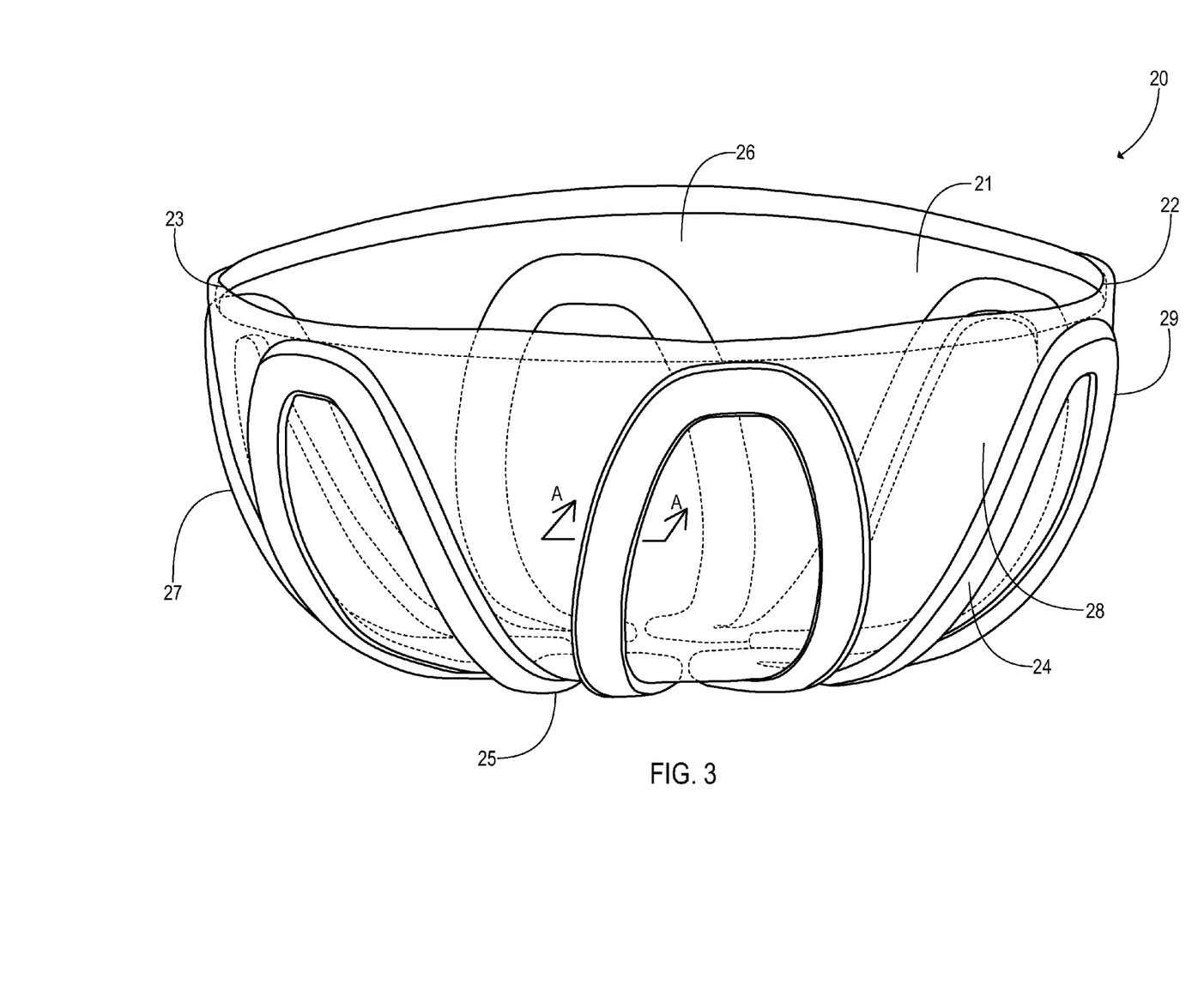
FIG. 3 depicts a schematic view of another exemplary container of the present invention.

FIG. 3 depicts a schematic view of another exemplary container 20 of the present invention. In this embodiment, exemplary container 20 comprises a food storage component (or main body component) 21 having at least one side wall 29, a side wall outer surface 27, a side wall inner surface 26, and a rim 22 extending along an upper edge of the at least one side wall 29. Food storage component 21 further comprises an upper portion 23 and a lower portion 25 with one or more ribbon structures 24 extending along a height direction of food storage component 21 from lower portion 25 of food storage component 21 to upper portion 23 of food storage component 21.

Figure 3A:
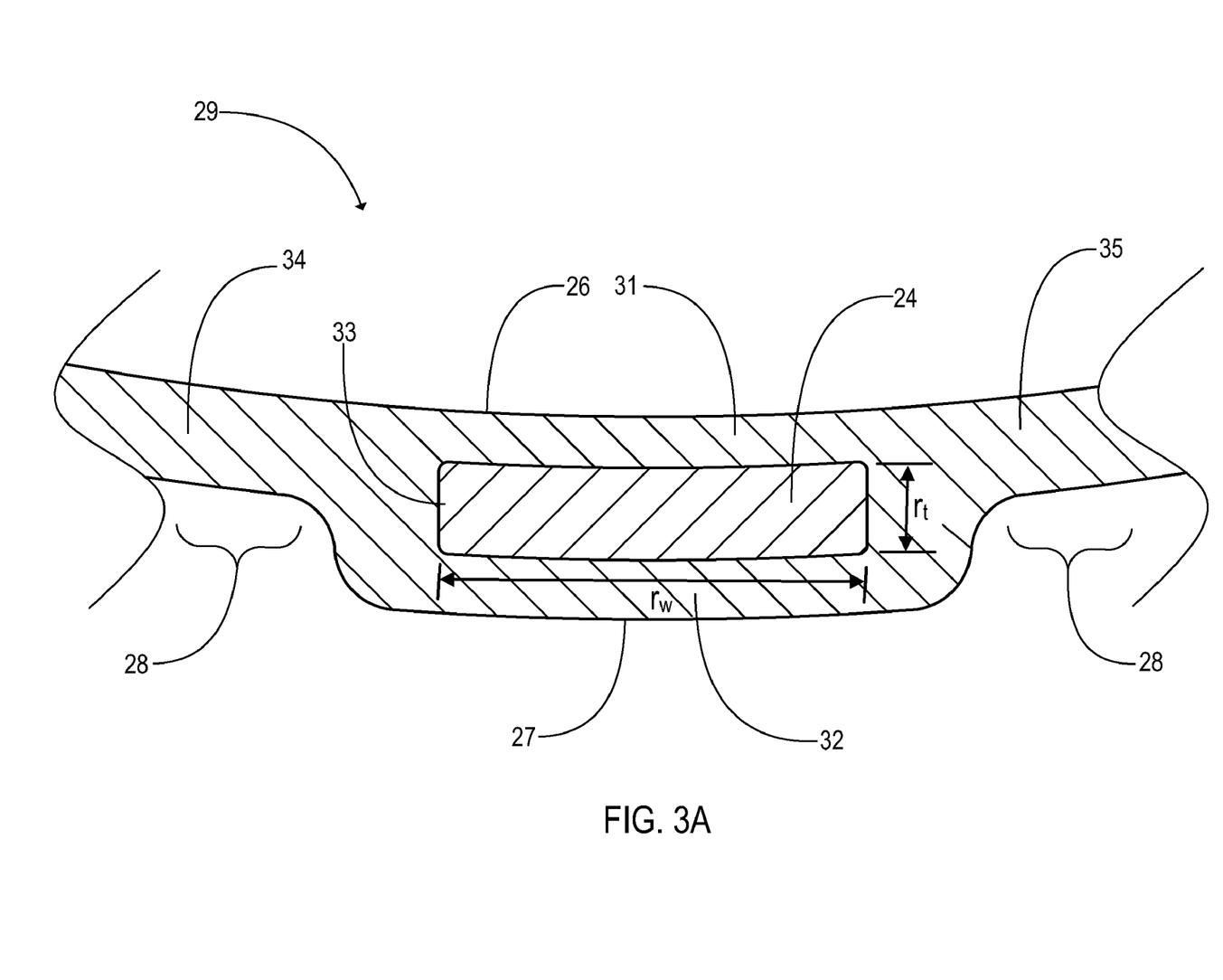
FIG. 3A depicts a cross-sectional view of a side wall of the exemplary container of FIG. 3 along line A-A shown in FIG. 3

FIG. 3A depicts a cross-sectional view of side wall 29 of food storage component 21 as viewed along line A-A shown in FIG. 3. As shown in FIG. 3A, side wall 29 comprises regions 28 in which side wall 29 comprises a single layer (or multiple layers) 34 or 35 of a single material. In other regions, side wall 29 comprises a ribbon structure 24 encapsulated by an encapsulating material. In these regions, side wall 29 comprises a multi-layered structure comprising an inner layer 31 forming side wall inner surface 26, an outer layer 32 forming side wall outer surface 27, and an intermediate layer 33 comprising ribbon structure 24.

The thickness of each of inner layer 31, outer layer 32, intermediate layer 33, and layers 34/35 and may vary depending on a number of factors including, but not limited to, the desired structural integrity of the resulting food storage component, the materials used to form the food storage component, and the application (e.g., food storage, food cooking, etc.) of the food storage component. Typically, inner layer 31, outer layer 32, and intermediate layer 33 each independently have an average layer thickness that ranges from about 1.0 mm to about 10.0 mm, desirably, from about 5.0 mm to about 7.0 mm. Typically, each of inner layer 31 and outer layer 32 independently has a layer thickness greater than that of intermediate layer 33 although each of inner layer 31 and outer layer 32 independently may have a layer thickness greater than, equal to or less than that of intermediate layer 33.

Typically, layers 34/35 within regions 28 each independently have an average layer thickness that ranges from about 2.0 mm to about 10.0 mm, desirably, from about 5.0 mm to about 7.0 mm. However, it should be understood that layers 34/35 within regions 28 may each independently have an average layer thickness that is greater than, equal to or less than an overall layer thickness represented by the combination of inner layer 31, outer layer 32, and intermediate layer 33.

In one exemplary embodiment, intermediate layer 33 comprises a ribbon structure 24 having a ribbon thickness, $r_t$, of from about 1.0 mm to about 5.0 mm, and a ribbon width, $r_w$, of from about 5.0 mm to about 10.0 mm (see, for example, ribbon structure 24 shown in FIG. 3A). However, it should be understood that intermediate layer 33 may comprise a variety of reinforcing structures (e.g., shapes, configurations, etc.) having a variety of dimensions as discussed further below.

The materials used to form each of inner layer 31, outer layer 32, intermediate layer 33, and layers 34/35 may vary depending on a number of factors including, but not limited to, the desired structural integrity of the resulting food storage component, and the application (e.g., food storage, food cooking, etc.) of the food storage component. Typically, inner layer 31, outer layer 32, and layers 34/35 comprise a food grade silicone material. Suitable food grade silicone materials include, but are not limited to, silicone resins commercially available from Dow Corning Corporation (Midland, Mich.) under the trade designation SILASTIC® resins, as well as silicone resins commercially available from GE Silicones (Wilton, Conn.). Suitable SILASTIC® resins include, but are not limited to, SILASTIC® LC resins, SILASTIC® HCR resins, SILASTIC® FSR resins and SILASTIC® LSR resins (e.g., SILASTIC® LC 50-2004 or SILASTIC® LC 60-2004 or SILASTIC® LC 70-2004 resin).

Intermediate layer 33 (or ribbon structure 24) typically comprises a high temperature polymer selected from the group consisting of a polyphthalamide, a polysulfone, a polyethersulfone a polyphenylsulfone, a polyamideimide, a liquid crystal polymer, and any combination thereof. In one desired embodiment, the high temperature polymer used to form intermediate layer 33 (or ribbon structure 24) comprises a polysulfone or a polyethersulfone. In another desired embodiment, the high temperature polymer used to form intermediate layer 33 (or ribbon structure 24) comprises a liquid crystal polymer.

Suitable high temperature polymers include, but are not limited to, polyphthalamides commercially available from Solvay Advanced Polymers (Alpharetta, Ga.) under the trade designation AMODEL® polymers; polysulfones commercially available from Solvay Advanced Polymers under the trade designation UDEL® polymers; polyethersulfones commercially available from Solvay Advanced Polymers under the trade designation RADEL® A polymers; polyphenylsulfones commercially available from Solvay Advanced Polymers under the trade designation RADEL® R polymers; polyamideimides commercially available from Solvay Advanced Polymers under the trade designation TORLON® polymers; and liquid crystal polymers commercially available from Solvay Advanced Polymers under the trade designation XYDAR® polymers and commercially available from Ticona Engineering Polymers (Florence, Ky.) under the trade designation VECTRA® LCP polymers.

In one desired embodiment, the container of the present invention comprises a food storage component having a structure similar to food storage component 21 shown in FIGS. 3-3A, wherein at least a portion of a cross-section of at least one side wall extending from an side wall inner surface to an side wall outer surface comprises a multi-layered structure comprising an inner layer of food grade silicone material, an outer layer of food grade silicone material, and an intermediate layer of polysulfone or polyethersulfone material encapsulated by the inner and outer layers. In regions free of ribbon structures (e.g., regions 28 of food storage component 21 shown in FIGS. 3-3A), a cross-section of the at least one side wall extending from the side wall inner surface to the side wall outer surface consists essentially of a food grade silicone material (e.g., a SILASTIC® resin) having a single layer or multiple layer structure, typically, a single layer structure.

Figure 4:
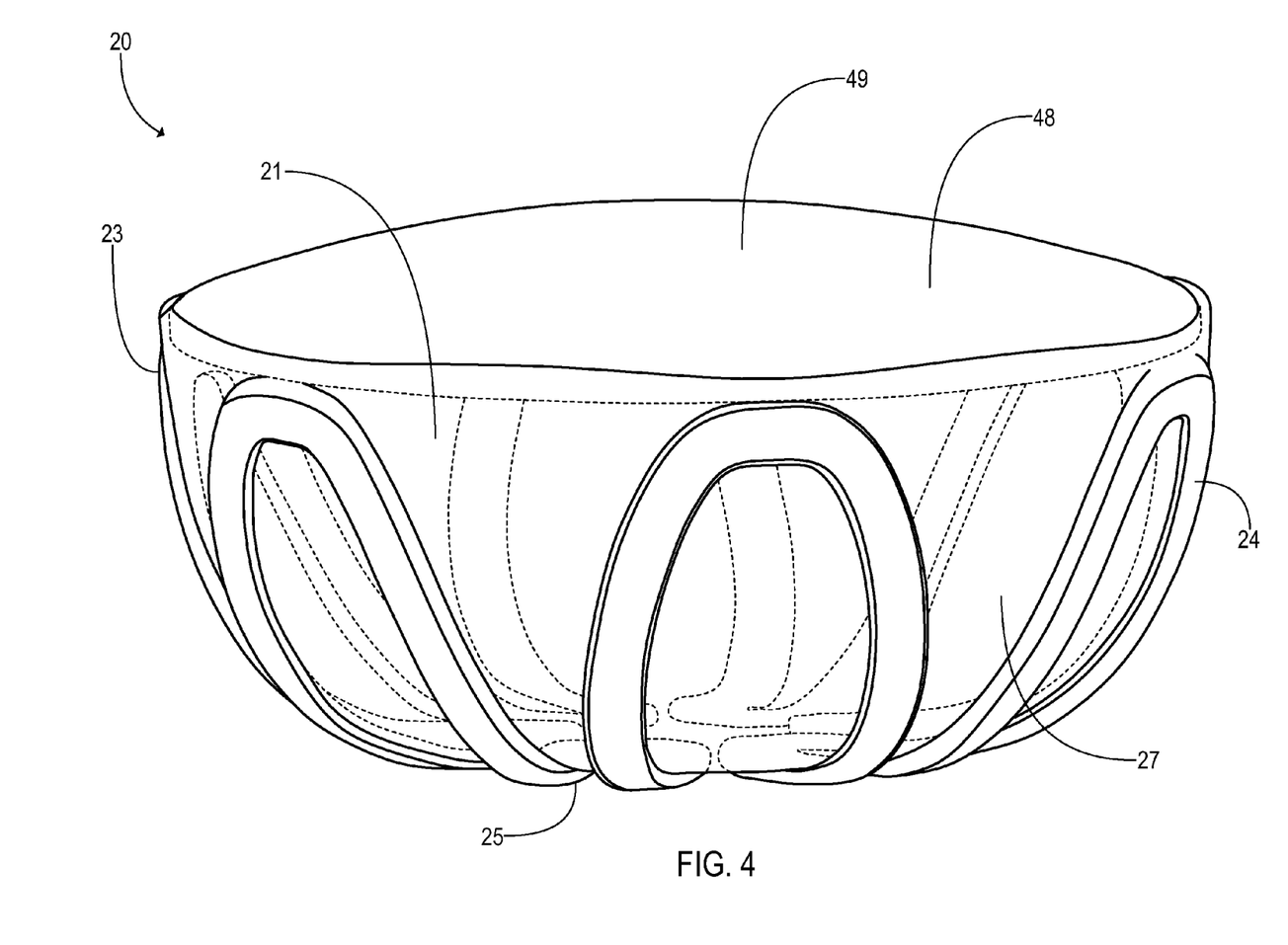
FIG. 4 depicts a schematic view of the exemplary container of FIG. 3 in combination with a lid component releasably attached to a base component.

FIG. 4 depicts a schematic view of exemplary container 20 of FIG. 3 in combination with a lid component 48 releasably attached to food storage component 21. Although not shown in, FIG. 4, lid component 48 and food storage component 21 may each independently further comprise one or more hand grips along an upper surface 49 of lid component 48 and/or along side wall outer surface 27 of food storage component 21.

Lid component 48 may comprise a variety of materials including, but not limited to, the above-described materials for forming the food storage component of the disclosed containers. In one exemplary embodiment, the lid (e.g., lid component 48) of the disclosed container (e.g., container 20) comprises a food grade silicone material (e.g., a SILASTIC® resin) having a single layer or multiple layer structure, typically, a single layer structure.

In another exemplary embodiment, at least a portion of the lid (e.g., lid component 48) of the disclosed container (e.g., container 20) comprises a multi-layered structure comprising an inner lid layer of food grade silicone material, an outer lid layer of food grade silicone material, and an intermediate lid layer comprising a high temperature polymer selected from the group consisting of a polyphthalamide, a polysulfone, a polyethersulfone a polyphenylsulfone, a polyamideimide, a liquid crystal polymer, and any combination thereof. When the intermediate lid layer is present, the intermediate lid layer typically comprises a liquid crystal polymer (e.g., VECTRA® LCP polymer) encapsulated by inner and outer lid layers of food grade silicone material (e.g., a SILASTIC® resin such as SILASTIC® LC 50-2004).

Figure 5:
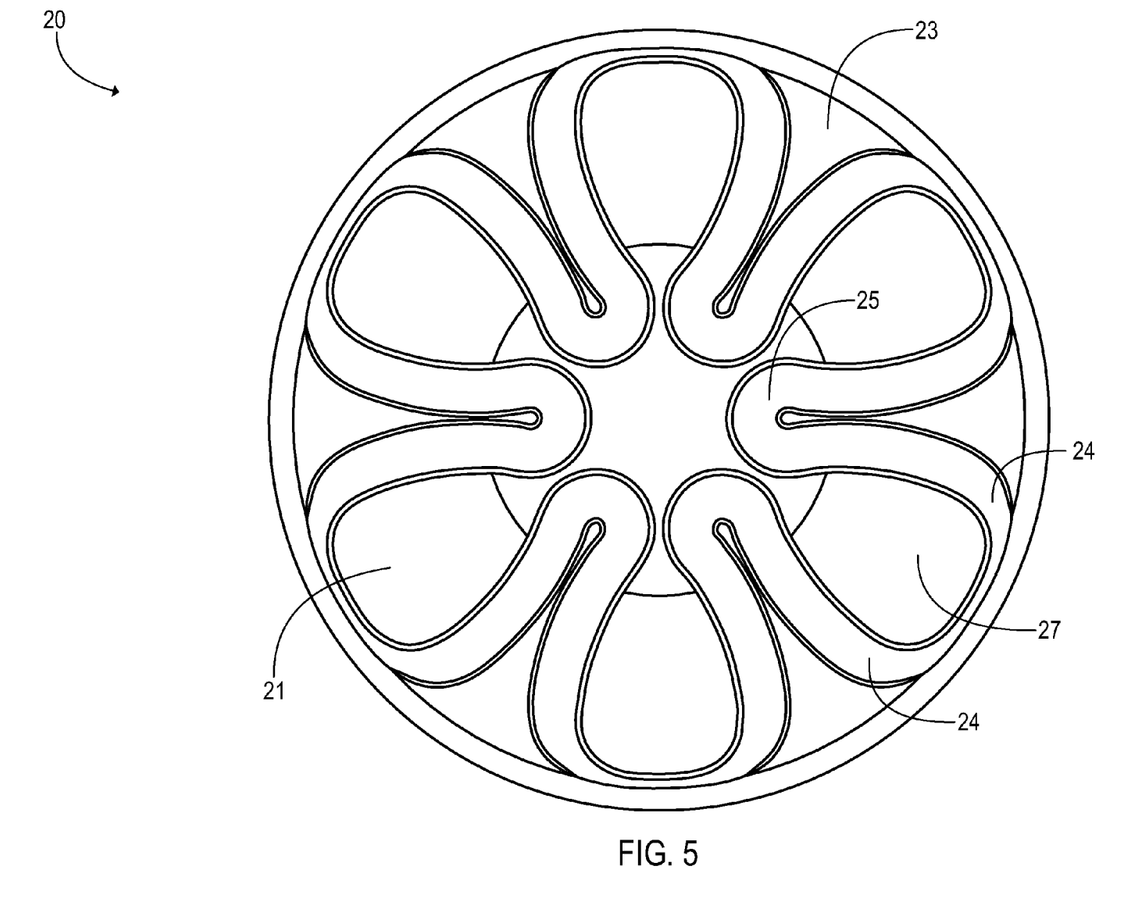
FIG. 5 depicts a view of a bottom portion of the exemplary container of FIG. 3.

FIG. 5 depicts a view of a bottom portion of food storage component 21 of exemplary container 20 shown in FIG. 3. As shown in FIG. 5, food storage component 21 comprise side wall outer surface 27, upper portion 23, lower portion 25, and ribbon structure 24 extending from lower portion 25 of food storage component 21 to upper portion 23 of food storage component 21. In this exemplary desired embodiment, ribbon structure 24 comprises a single continuous loop, at least a portion of which extends along a height direction from lower portion 25 of food storage component 21 to upper portion 23 of food storage component 21. In other words, ribbon structure 24 does not intersect itself along any portion of ribbon structure 24 and forms a continuous loop within side wall 29 of food storage component 21.

In one exemplary embodiment, the single continuous loop (i.e., ribbon structure 24) has a continuous loop length that is greater than about 4 times a height of food storage component 21. In other words, ribbon structure 24 forms at least two "petals" within side wall 29 of food storage component 21. In another exemplary embodiment, the single continuous loop (i.e., ribbon structure 24) has a continuous loop length that is greater than about 10 times the height of food storage component 21 (i.e., ribbon structure 24 forms at least 5 "petals" within side wall 29 of food storage component 21). In yet another exemplary embodiment, the single continuous loop (i.e., ribbon structure 24) has a continuous loop length that is greater than about 12 times the height of food storage component 21 (i.e., ribbon structure 24 forms 6 or more "petals" within side wall 29 of food storage component 21 as shown in FIG. 5).

Figure 6:
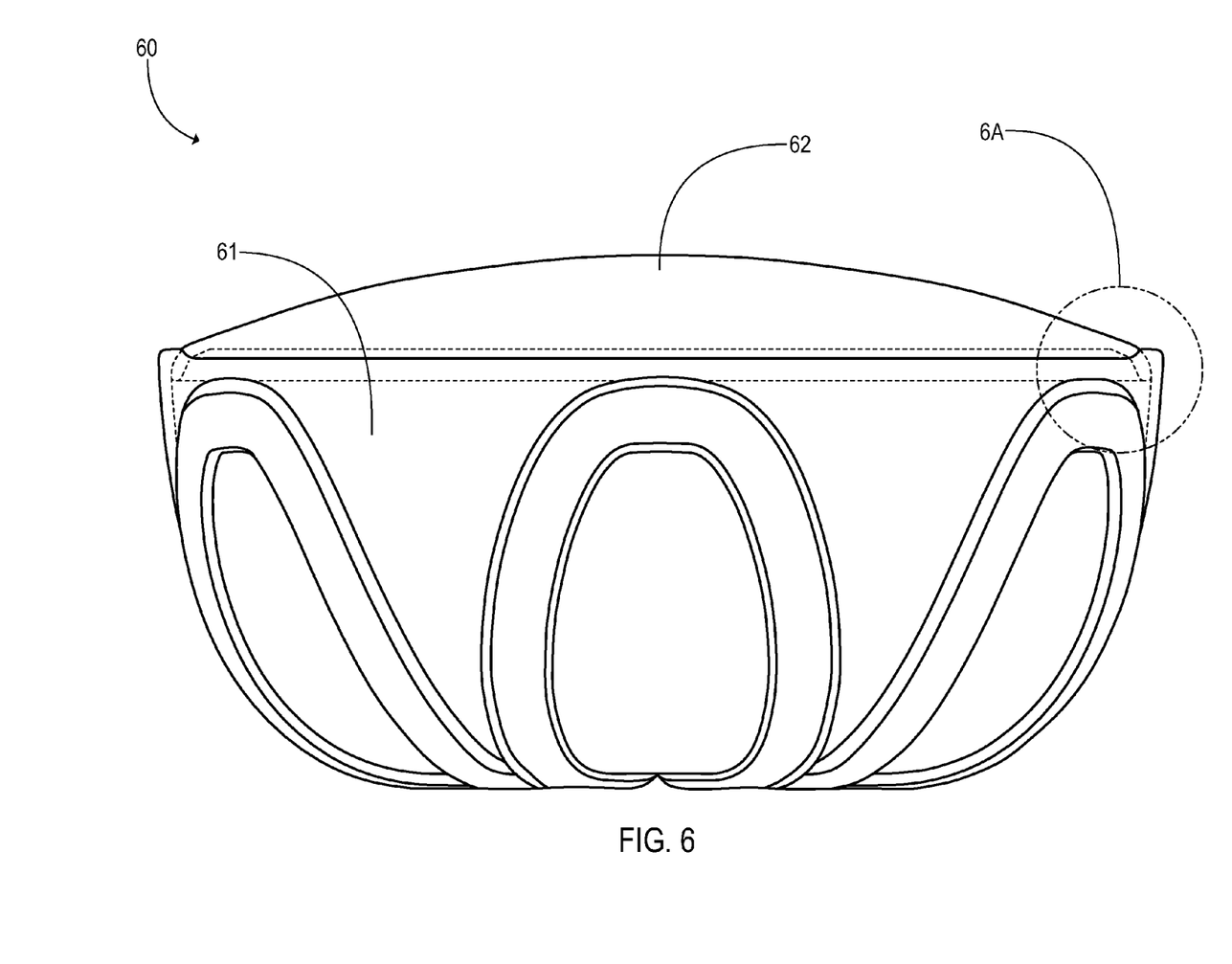
FIG. 6 depicts a schematic view of another exemplary container comprising a food storage component in combination with a lid component releasably attached to the food storage component via a cork-type seal.
Figure 6A:
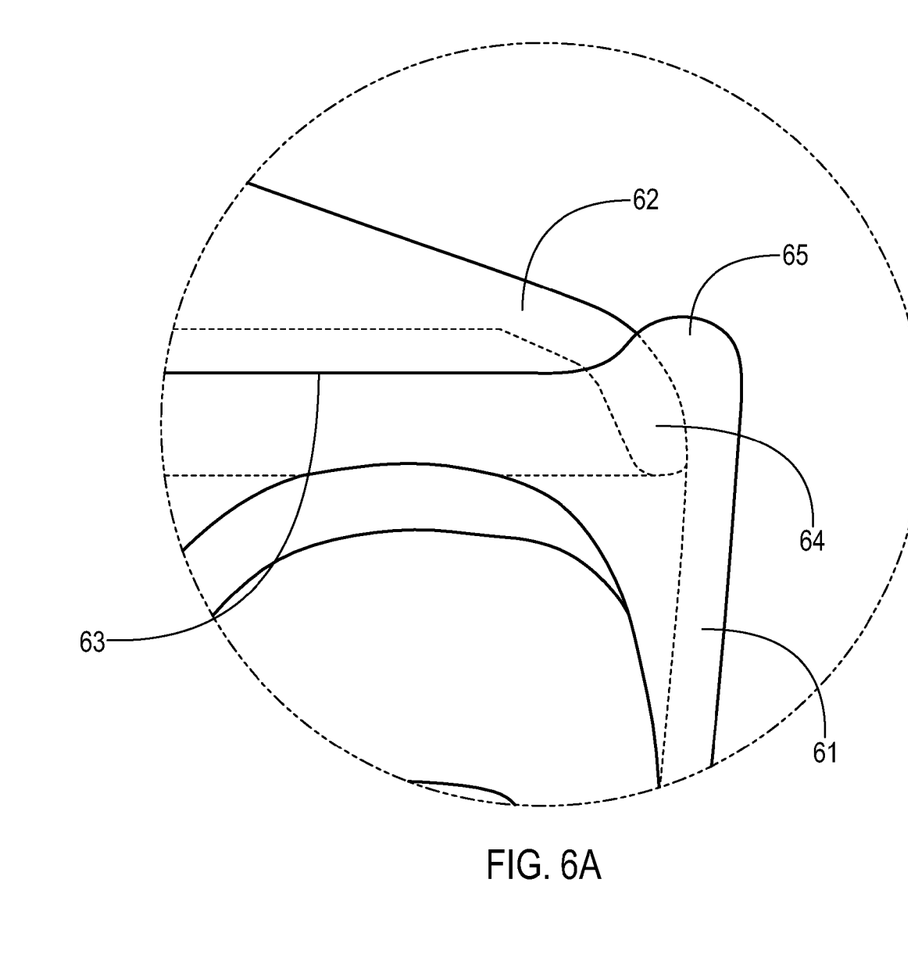
FIG. 6A depicts an exploded view of the circled area of the exemplary container of FIG. 6 identified as circle "A".

FIG. 6 depicts a schematic view of another exemplary container 60 comprising a food storage component 61 in combination with a lid component 62 releasably attached to food storage component 61 via a cork-type seal. FIG. 6A depicts an exploded view of the circled area of the exemplary container of FIG. 6 identified as circle "A". As shown in FIG. 6A, food storage component 61 comprises an upper portion 63 having one or more overlapping members 65 that extend over one or more edge portions 64 of lid component 62 when lid component 62 is releasably attached to food storage component 61. When one or more overlapping members 65 are present, food storage component 61 typically comprises from about 2 to about 6 overlapping members 65 positioned equally distanced about upper portion 63 of food storage component 61.

It should be noted that the lid component of the disclosed containers could snap onto a corresponding container component (e.g., a bowl component) via any other closure system including, but not limited to, a clasping system, and any other male/female shaped closure system.

Although ribbon structure 24 is shown having a single continuous loop configuration, it should be understood that ribbon structure 24 may have other configurations although not shown in the figures. For example, ribbon structure 24 may comprise a single continuous star-like structure having a single central ribbon portion and multiple appendages extending from the single central ribbon portion, wherein one or more (or each) of the multiple appendages extends along a height direction from a lower portion of the food storage component (e.g., lower portion 25 of food storage component 21) to an upper portion of the food storage component (e.g., upper portion 23 of food storage component 21).

The reinforcing member (e.g., intermediate layer 33 or ribbon structure 24) may have other configurations, shapes and dimensions from those shown in the figures. For example, the reinforcing member (e.g., intermediate layer 33 or ribbon structure 24) could be completely solid and have a shape, for example, of a bowl. In another exemplary embodiment, the reinforcing member (e.g., intermediate layer 33 or ribbon structure 24) could be shaped, for example, like a bowl with some areas cut out) so as to form a single continuous reinforcing structure having perforations (e.g., openings) therein. In yet another exemplary embodiment, the reinforcing member (e.g., intermediate layer 33 or ribbon structure 24) could be shaped like straight sticks, ribbons or lines, extending down the sides of a bowl, around the bowl or out from a central area similar to a "bike wheel spoke" configuration. In this later embodiment, the straight sticks, ribbons or lines can form (i) a single continuous reinforcing structure or (ii) multiple reinforcing components that together provide reinforcement to the resulting container.

Typically, regardless of the configuration, shape and/or dimensions of the reinforcing member(s) (e.g., intermediate layer 33 or ribbon structure 24) the reinforcing member(s) is completely encased in a silicone material. However, there may be some embodiments in which a silicone material does not completely encapsulate the reinforcing member(s) such that at least a portion of the reinforcing member(s) forms an outer surface of the container.

In one exemplary embodiment (not shown in the figures), the container of the present invention comprises a food storage component comprising at least one side wall, a side wall outer surface, a side wall inner surface, and a rim extending along an edge of the at least one side wall; wherein the food storage component provides a volume operatively adapted for food storage that is bound by the inner surface of the at least one side wall; and wherein at least a portion of a cross-section of the at least one side wall extending from the side wall inner surface to the side wall outer surface comprises a multi-layered structure comprising an inner layer of food grade silicone material, an outer layer of food grade silicone material, and an intermediate layer of a high temperature polymer encapsulated by the inner and outer layers, the high temperature polymer being selected from the group consisting of a polyphthalamide, a polysulfone, a polyethersulfone a polyphenylsulfone, a polyamideimide, a liquid crystal polymer, and any combination thereof; wherein the intermediate layer comprises a ribbon structure in the form of a single continuous star-like structure having a central ribbon portion and multiple appendages extending from the central ribbon portion, and wherein one or more (or each) of the multiple appendages extends along a height direction from a lower portion of the food storage component to an upper portion of the food storage component.

Any of the above-described containers may further comprise a lid component that forms an air and water tight seal with any of the above-described food storage components of the containers. In one desired embodiment of the present invention, the above-described food storage components and lids of the above-described containers comprise food grade silicone material comprising a SILASTIC® resin from Dow Corning Corporation (Midland, Mich.) such as SILASTIC® LC 50-2004 or SILASTIC® LC 60-2004 resin, and any intermediate layers, when present, comprise a high temperature polymer, desirably, a VECTRA® LCP polymer commercially available from Ticona Engineering Polymers (Florence, Ky.).

In any of the above-described embodiments, the lid and/or base component (e.g., bowl) may comprise a combination of different silicone materials in order to provide desired properties to portions of the lid and/or base component. For example, silicone materials having varying durometer or hardness may be utilized to help reinforce, stiffen or give extra flexibility to certain areas of the lid and/or base component. Further, inner or outer surfaces of the silicone material can be altered so as to form ribbing, ribs or grooves so as to help create an optimal shape/size/usability for the lid and/or base component.

The present invention is further directed to methods of making and using the disclosed containers and container components. In one exemplary method, the method of making a container comprises (a) forming an intermediate layer via a first thermoforming step, the intermediate layer comprising of a high temperature polymer, the high temperature polymer being selected from the group consisting of a polyphthalamide, a polysulfone, a polyethersulfone a polyphenylsulfone, a polyamideimide, a liquid crystal polymer, and any combination thereof; (b) encapsulating the intermediate layer with inner and outer layers to form a multi-layered structure, the inner and outer layers comprising a food grade silicone material; (c) forming the multi-layered structure into a food storage component via a second thermoforming step, the food storage component comprising at least one side wall, a side wall outer surface, a side wall inner surface, and a rim extending along an edge of the at least one side wall, wherein the food storage component provides a volume operatively adapted for food storage that is bound by the inner surface of the at least one side wall; and (d) optionally, forming a lid component via a third thermoforming step, the lid component being releasably attachable to the food storage component along the rim.

In one exemplary embodiment, each of the thermoforming steps comprises a molding step such as an injection molding step. In one desired embodiment, the intermediate layer (or ribbon structure) is formed via an injection molding step, and a food grade silicone resin material is overmolded onto the intermediate layer (or ribbon structure) so as to encapsulate the intermediate layer (or ribbon structure). The overmolding step may be conducted with or without one or more additional steps so as to enhance the bond between the intermediate layer (or ribbon structure) and the encapsulating material. When present, additional bond-enhancing steps may include the use of an adhesive layer or primer layer between the intermediate layer (or ribbon structure) and the encapsulating material.

Various additives may be included in the materials used to form the container components of the present invention. These additives may be added to a polymeric blend melt or added to the material after casting/molding (e.g., during a coating step). Such additives include, but are not limited to, ultraviolet radiation absorbers, antioxidants, organic or inorganic colorants (e.g., dyes or pigments), stabilizers, fragrances, plasticizers, anti-microbial agents, flame retardants, antifouling compounds, and combinations thereof. The amount of each optional additive is generally no more than about 15 wt-% of the polymeric material used to form a given container component, often no more than 5 wt-% of the polymeric material used to form a given container component.

The present invention is described above and further illustrated below by way of examples, which are not to be construed in any way as imposing limitations upon the scope of the invention. On the contrary, it is to be clearly understood that resort may be had to various other embodiments, modifications, and equivalents thereof which, after reading the description herein, may suggest themselves to those skilled in the art without departing from the spirit of the present invention and/or the scope of the appended claims.

EXAMPLES

The following examples are given to show containers that have been made in accordance with the present invention. However, it will be understood that the following examples are exemplary only, and are not intended to be comprehensive of the many different containers, which may be made in accordance with the present invention.

Example 1

A container having a construction as shown in FIGS. 3-5 was prepared using the method described below. A reinforcing member in the form of a continuous loop was prepared using a first injection molding step in which a liquid crystal polymer (i.e., VECTRA® E540i from Ticona Engineering Polymers (Florence, Ky.)) was molded. Once formed, the reinforcing member was placed in a second mold. A second injection molding step was conducted in the second mold wherein SILASTIC® LSR LC 50-2004 resin from Dow Corning Corporation (Midland, Mich.) was injected into the second mold so as to encapsulate the reinforcing member.

In a separate mold, a lid component was formed by a third injection molding step wherein SILASTIC® LSR LC 50-2004 resin from Dow Corning Corporation (Midland, Mich.) was injected into the third mold so as to form the lid component.

While the specification has been described in detail with respect to specific embodiments thereof, it will be appreciated that those skilled in the art, upon attaining an understanding of the foregoing, may readily conceive of alterations to, variations of, and equivalents to these embodiments. Accordingly, the scope of the present invention should be assessed as that of the appended claims and any equivalents thereto.

What is claimed is:

1. A container comprising:
    a food storage component comprising at least one side wall, a side wall outer surface, a side wall inner surface, and a rim extending along an edge of the at least one side wall; and
    a lid component that is releasably attachable to the food storage component along the rim;
    said food storage component and said lid providing a sealed volume operatively adapted for food storage that is bound by (i) the inner surface of the at least one side wall and (ii) an outer surface of the lid when the lid is releasably attached to the food storage component;
    at least a portion of a cross-section of the at least one side wall extending from the side wall inner surface to the side wall outer surface comprises a multi-layered structure comprising:
        an inner layer of food grade silicone material;
        an outer layer of food grade silicone material; and
        an intermediate layer of a high temperature polymer encapsulated by said inner and outer layers, wherein said intermediate layer comprises a ribbon structure comprising a single continuous star-like structure having a single central ribbon portion and multiple appendages extending from the single central ribbon portion, said multiple appendages extending along a height direction from a lower portion of said food storage component to an upper portion of said food storage component.

2. The container of claim 1, wherein at least a portion of a cross-section of the at least one side wall extending from the side wall inner surface to the side wall outer surface consists essentially of food grade silicone material.

3. The container of claim 1, wherein said ribbon structure has a ribbon thickness of from 1.0 to 5.0 mm, and a ribbon width of from 5.0 to 10.0 mm.

4. The container of claim 3, wherein said ribbon structure comprises a single continuous loop.

5. The container of claim 4, wherein said single continuous loop has a continuous loop length that is greater than 4 times a height of said food storage component.

6. The container of claim 5, wherein said continuous loop length is greater than 10 times the height of said food storage component.

7. The container of claim 1, wherein said lid comprises food grade silicone material.

8. The container of claim 7, wherein at least a portion of the lid comprises a multi-layered structure comprising:
    an inner lid layer of food grade silicone material;
    an outer lid layer of food grade silicone material; and
    an intermediate lid layer of a liquid crystal polymer material encapsulated by said inner and outer lid layers.

9. The container of claim 1, wherein said food storage component and said lid provide an air and water tight seal when the lid is releasably attached to the food storage component.

10. The container of claim 1, wherein said container is operatively adapted for use in a convection oven, a microwave oven, a refrigerator, a freezer, a dishwasher, or any combination thereof.

11. The container of claim 1, wherein said food storage component and said lid form a cork-style seal when the lid is releasably attached to the food storage component, and wherein said cork-style seal is augmented with one or more food storage component overlapping members that extend over one or more edge portions of the lid when the lid is releasably attached to the food storage component.

12. The container of claim 1, wherein said food storage component further comprises one or more hand grips along said side wall outer surface.

13. The container of claim 1, wherein said lid component further comprises one or more hand grips along an outer lid surface.

14. The container of claim 1, wherein said intermediate layer comprises a polysulfone or polyethersulfone material.

15. A container comprising:
    a food storage component comprising at least one side wall, a side wall outer surface, a side wall inner surface, and a rim extending along an edge of the at least one side wall;
    said food storage component providing a volume operatively adapted for food storage that is bound by the inner surface of the at least one side wall;
    at least a portion of a cross-section of the at least one side wall extending from the side wall inner surface to the side wall outer surface comprises a multi-layered structure comprising:
        an inner layer of food grade silicone material;
        an outer layer of food grade silicone material; and
        an intermediate layer of a high temperature polymer encapsulated by said inner and outer layers;
    said intermediate layer comprising a ribbon structure in the form of a single continuous star-like structure having a central ribbon portion and multiple appendages extending from the central ribbon portion, said multiple appendages extending along a height direction from a lower portion of said food storage component to an upper portion of said food storage component.

16. The container of claim 15, wherein said intermediate layer comprises a liquid crystal polymer.

17. The container of claim 15, further comprising a lid component that is releasably attachable to the food storage component along the rim.

18. The container of claim 15, wherein said high temperature polymer is selected from the group consisting of a polyphthalamide, a polysulfone, a polyethersulfone a polyphenylsulfone, a polyamideimide, a liquid crystal polymer, and any combination thereof.

19. A container comprising:
    a food storage component comprising at least one side wall, a side wall outer surface, a side wall inner surface, and a rim extending along an edge of the at least one side wall;
    said food storage component providing a volume operatively adapted for food storage that is bound by the inner surface of the at least one side wall;

at least a portion of a cross-section of the at least one side wall extending from the side wall inner surface to the side wall outer surface comprises a multi-layered structure comprising:

an inner layer of food grade silicone material;

an outer layer of food grade silicone material; and an intermediate layer of a high temperature polymer encapsulated by said inner and outer layers, said high temperature polymer comprising a liquid crystal polymer;

said intermediate layer comprising a ribbon structure in the form of a single continuous star-like structure having a central ribbon portion and multiple appendages extending from the central ribbon portion, said multiple appendages extending along a height direction from a lower portion of said food storage component to an upper portion of said food storage component.

20. The container of claim 19, further comprising a lid component that is releasably attachable to the food storage component along the rim.

* * * * *